US012051277B1

(12) United States Patent
Kulkarni et al.

(10) Patent No.: US 12,051,277 B1
(45) Date of Patent: Jul. 30, 2024

(54) MULTI-SENSOR INPUT DEVICE

(71) Applicant: AMAZON TECHNOLOGIES, INC., Seattle, WA (US)

(72) Inventors: Amit Sharad Kulkarni, Redmond, WA (US); Baomin Wang, Seattle, WA (US); Umer Shahid, Sammamish, WA (US); Matthew Christopher Smith, Seattle, WA (US); Howie Ho Wai Lau, Seattle, WA (US); Jennifer Li, Seattle, WA (US); Oluseyi Oluyemisi Babatola, Seattle, WA (US); Craig Black, Bellevue, WA (US); Douglas Christopher Bruey, Seattle, WA (US); Charles Joseph Tucker Peach, Kirkland, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/303,626

(22) Filed: Jun. 3, 2021

(51) Int. Cl.
*G06V 40/70* (2022.01)
*G06F 3/02* (2006.01)
*G06V 40/12* (2022.01)

(52) U.S. Cl.
CPC .............. *G06V 40/70* (2022.01); *G06F 3/021* (2013.01); *G06V 40/1365* (2022.01)

(58) Field of Classification Search
CPC ............ H01L 27/153; G02F 1/133603; G02F 1/133617; G02B 6/0068; G02B 5/201; G02B 5/208; G06F 3/04883; G06F 3/0412; G06F 3/0488; G06F 1/1652; G06F 3/011; G06F 3/017; G06F 1/1626; G06F 3/0482; G06F 3/04842; G06F 1/163; G06F 21/32; G06F 3/0304; G06F 3/041–047; G06F 2203/041–04114; G06F 3/042–0415; G06K 7/10722; G06K 7/10821; H04N 5/2256; H04N 5/23245; H04N 5/332; H04N 21/4223
See application file for complete search history.

(56) References Cited

U.S. PATENT DOCUMENTS

| | | | |
|---|---|---|---|
| 6,686,539 B2 | 2/2004 | Farquhar et al. | |
| 7,868,441 B2 | 1/2011 | Eaton et al. | |
| 2011/0122563 A1 | 5/2011 | Hsu et al. | |
| 2017/0091568 A1* | 3/2017 | Hama | G06V 10/42 |
| 2019/0259148 A1* | 8/2019 | Hunt | H04N 5/2256 |
| 2019/0392189 A1* | 12/2019 | Kumar | G06V 40/70 |
| 2020/0302147 A1* | 9/2020 | Gabriele | G03B 15/05 |

FOREIGN PATENT DOCUMENTS

KR 200480291 Y1 5/2016

* cited by examiner

*Primary Examiner* — Sanjiv D. Patel
(74) *Attorney, Agent, or Firm* — Lindauer Law, PLLC

(57) ABSTRACT

A multi-sensor input device includes multi-color lights to illuminate a user's hand with various colors of light including visible and infrared, as well as sensors including a photodetector, a red-green-blue (RGB) camera, and an infrared camera. During operation, sensor data generated by the sensors may represent non-biometric input such as a barcode that is printed or shown on another device's display, biometric input such as images of surface and subcutaneous features of the user's hand, and so forth. The biometric input may then be processed to identify the user. The input device also includes antitamper features to improve security. The input device may be used at various locations, such as at an entry portal, point of sale, and so forth.

21 Claims, 9 Drawing Sheets

MULTI-SENSOR INPUT DEVICE

BACKGROUND

Facilities such as stores, libraries, hospitals, offices, apartments, and so forth, may need the ability to identify users at the facility or acquire other input.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
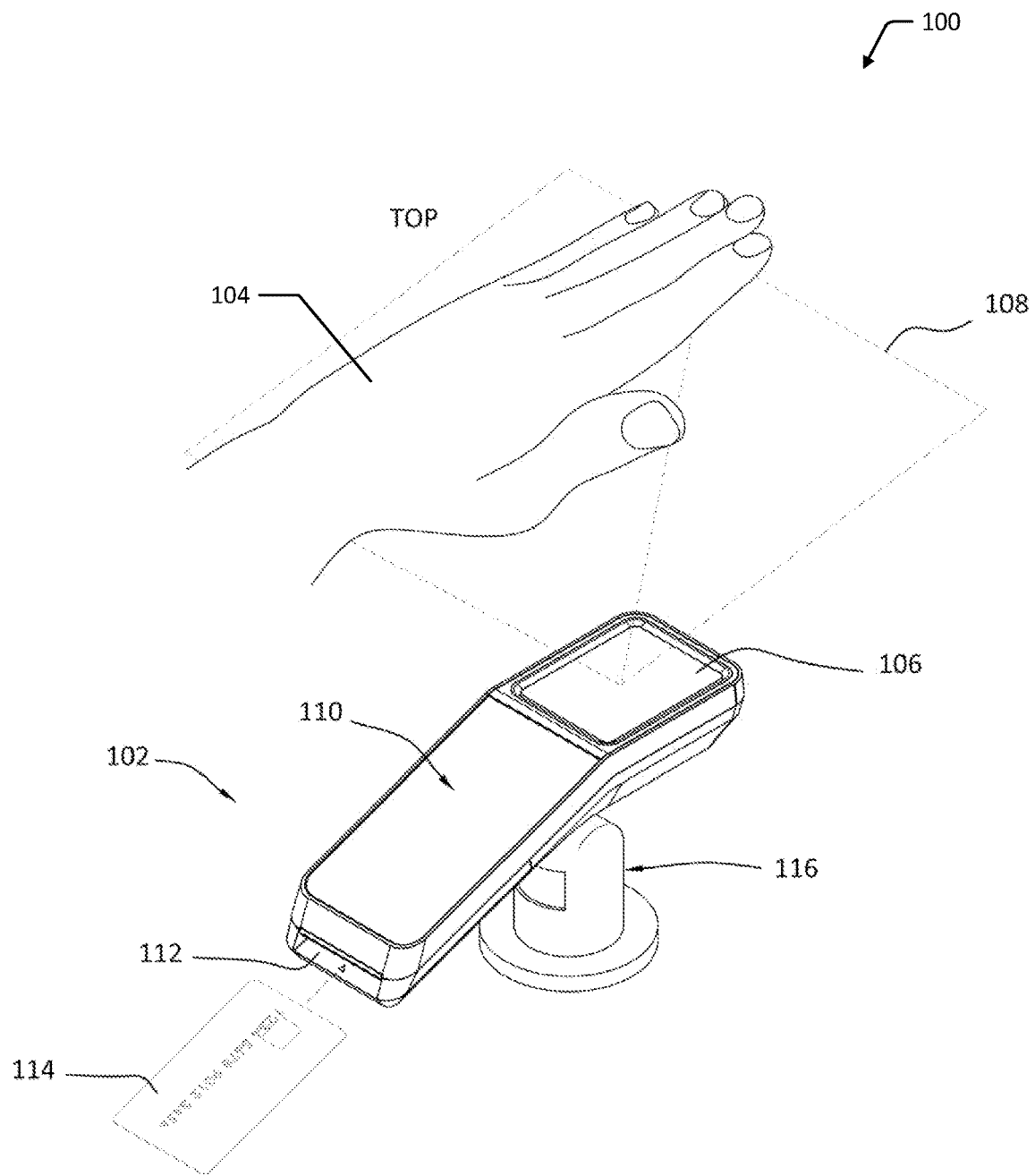
FIG. 1 illustrates a multi-sensor input device, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Accurate and fast acquisition of input by an input device may be used in a variety of ways including determining if physical access is permitted, determining a payment method to be used, and so forth. Different kinds of input may include use of EMV cards, optical barcodes, biometric input, and so forth. In one implementation, biometric input may be used to control physical access to a facility or portion thereof. For example, entrance to an office, residence, warehouse, transportation facility, or other location, may be responsive to a user presenting biometric input at an entry portal.

In another implementation, biometric input may be used to facilitate payment for goods or services. For example, an input device may be used at a point-of-sale (POS). Biometric input may be obtained and used to determine an identity of the user. The identity of the user may then be associated with a payment method, such as an account, previously stored bank or credit card account, and so forth. Continuing the example, a user may also present a barcode coupon at the POS sale to obtain a discount on the remaining balance of the transaction. The barcode may be presented that is printed or is shown on a display of another device. Other operations may also be facilitated by the input device. For example, a user may use the input device to associate an account indicated by an EMV card with their biometric input.

In another situation the input device may use a multifactor authentication approach based on biometric input as well as a physical token, such as a smart card that is in the possession of the user. Such multifactor authentication may be used to sign an electronic record. For example, the combination of biometric input and the physical token may be used to provide information as to the particular user who agreed to a contract, accepted a delivery, and so forth.

Traditional systems for identifying users suffer from several significant drawbacks including susceptibility to fraud, lack of speed, inaccuracy, and operational limitations. Biometric identification systems identify users based on a characteristic of the particular individual that is difficult or impossible to copy or be transferred. Operation of traditional biometric identification systems introduce operational problems such as slow data acquisition, limited resolution, increased wear in heavy-use environments, and so forth. For example, traditional palm-based biometric identification systems require physical contact between the user's hand and a scanning device. This physical contact may be deemed unsanitary and may be difficult to accomplish for some users. The data acquired by these systems may also be of relatively low resolution resulting in decreased confidence in the identification. These and other factors result in existing systems being unsuitable for use in situations where rapid identification of users is called for without significantly impeding the flow of user traffic. For example, the delays introduced by existing systems would produce serious negative impacts such as delays in a busy checkout line or at an entry to the facility at rush hours.

Traditional biometric identification systems have also utilized discrete devices that do not support acquisition of other input. This results in increased cost due to additional hardware, additional space requirements for additional hardware, and so forth.

Described in this disclosure is a multi-sensor input device (device) comprising a plurality of sensors to acquire input. The input may comprise sensor data that is representative of non-biometric input, biometric input, or both. The non-biometric input may comprise data from a smart card that is in communication with a card reader of the device, image data such as a visible light image of a barcode, and so forth.

The biometric input may comprise images that may be used for non-contact biometric identification of users. The device includes a sensor assembly that may include a distance sensor, such as an optical time-of-flight sensor. When the distance sensor detects a presence of an object, one or more operations may be performed by the device.

In one implementation the device may include one or more visible light sources. Responsive to the presence of an object, the one or more visible light sources may emit light of different colors at different times to illuminate the object. Each color may be emitted at a particular time, separate from the other colors. A photodetector may be used to determine the relative intensity of the reflected colors at the corresponding particular times. This information may be used to characterize the object. For example, based on the intensity data provided by the photodetector, the object may be determined to be part of a person, such as a hand. Responsive to this determination, the device may proceed to take other operations, such as acquiring other sensor data.

The device may include a visible light camera. In one implementation, the visible light camera may be used to acquire visible light image data of the hand. The visible light image data may be used to determine information about the pose of the hand. This information may be used to provide feedback to the user, directing them to modify the pose of their hand to attain a pose that is suitable for identification.

Biometric input may comprise images acquired by an infrared camera. Polarized infrared light sources in the device may be activated at different times to provide illumination while an infrared camera in the device that is sensitive to infrared light acquires images at the different times. The images are of objects within the camera's field of view (FOV) and as illuminated by infrared light with different polarizations at different times. For example, a first set of one or more images may be obtained that use infrared light with a first polarization and a second set of one or more images that use infrared light with a second polarization. The infrared camera may include a polarizer with the first polarization. The first set of images depict external characteristics, such as lines and creases in the user's palm while the second set of images depict internal anatomical structures, such as veins, bones, soft tissue, or other structures beneath the epidermis of the skin.

The biometric input may then be processed to determine information indicative of features in the images. In one implementation the biometric input may be processed at least in part locally on the device. In another implementation the biometric input, or data based on the biometric input, may be encrypted and transmitted to a server for processing to determine identity, payment account information, authorization to pass through a portal, and so forth.

The device may include output devices. In one implementation the one or more visible light sources may be used to provide output to the user. A light emitting diode (LED) that emits visible light may be operated to provide a visual indication to the user that data acquisition was successful or unsuccessful, to provide positioning prompts, and so forth. For example, as the user moves their hand into the FOV, the visible light LED may be illuminated blue, providing a visible indicator to the user that their hand is within the FOV. In another example, after successful image acquisition, the visible light LED may be illuminated green to provide a visible indicator to the user that usable images of their hand have been acquired. As mentioned earlier, the visible light sources may be used in conjunction with the photodetector to characterize the object in the FOV.

The device may include other output devices, such as a display, speaker, printer, and so forth. For example, a display screen may be used to provide information to the user such as prompting positioning of the hand, indicating acquisition of images was successful, approval or denial of a transaction, and so forth.

The device may include other input devices, such as a card reader, touch sensor, button, microphone, and so forth. The card reader may comprise a smart card reader that provides wired or wireless communication with a smart card such as an EMV card. For example, the user may insert an EMV card which, along with the images obtained by the sensor assembly, is used to authorize a transaction. In another example, the card reader may comprise a contactless card reader that acquires information from corresponding circuitry with a smartphone, fob, or other device. The touch sensor may be combined with the display screen to provide a touchscreen. The user may provide input by touching the touchscreen.

The plurality of sensors improve operation by providing sensor data that may be used to confirm that a user is actually present. For example, the use of the visible light sources and the photodetector allows an object within the FOV to be characterized as being living tissue. This provides a high degree of assurance that the biometric input is associated with an actual person, and not a constructed artifact.

The device may include one or more features to mitigate tampering and maintain the security of the device and data stored within the device, such as cryptographic keys. In one implementation, a tamper detection cover may be installed over components that would otherwise be accessible for probing. For example, a capacitor on a data line may be covered by a tamper detection cover. Displacement or penetration of the tamper detection cover would result in one or more actions to mitigate the effects of tampering. For example, data stored within the device may be erased responsive to a detected tamper event. In another example, a tampering event may result in destruction of circuitry, rendering at least a portion of the device inoperable.

The device is compact, allowing easy integration with existing or new systems. The device facilitates rapid acquisition of input in a variety of situations. The device is easily deployed, and different implementations may be used as a portable device, placed on a supporting structure, affixed to a stand, integrated with another device, and so forth. By using the biometric input acquired by the device, a computer system is able to determine the physical presence of a particular user at the particular device at a particular time. This information may be used to authorize payment of a transaction, gain entry to a secured area, sign a contract, and so forth.

Illustrative System

FIG. 1 illustrates a multi-sensor input device 102 (input device), according to some implementations. A user may approach the input device 102 and place their hand 104 over a sensor window 106 of the input device 102. A sensor assembly underneath the sensor window 106 may include one or more sensors having a field of view (FOV) 108. The sensors may include one or more of a distance sensor, a photodetector, a visible light camera, an infrared camera, and so forth. The sensors provide sensor data that may include one or more of non-biometric input, biometric input, and so forth. For example, the non-biometric input may comprise intensity data indicative of an intensity of light detected by the photodetector. In another example, the biometric input may comprise one or more images of the hand 104 that is within the FOV 108. The sensor assembly is discussed in more detail below. In this implementation the FOV 108 is oriented generally upwards. In other implementations the FOV 108 may be directed in other directions. For example, the FOV 108 may be directed downward and the user may place their hand 104 beneath the sensor window 106.

The input device 102 may include a display device 110 (display). For example, the display 110 may comprise a light emitting diode display, liquid crystal display, and so forth that is able to present text, images, and so forth. In some implementations, the display 110 may incorporate a touch sensor to operate as a touchscreen.

The input device 102 may include a card reader 112 that is able to operate in conjunction with a card 114. The card 114 may comprise a magnetic memory medium such as a magnetic stripe, optical medium such as a hologram, a microprocessor, or other devices. In some implementations the card 114 may comprise a device that is part of another device. For example, the card 114 may comprise circuitry that is part of a smartphone, fob, or other device.

The card reader 112 may be configured to interact with the card 114 via a wired or physical contact or wirelessly. For example, the card reader 112 may include a magnetic read head, electrical contacts, a near field communication (NFC) communication interface, and so forth. For example, to provide wired connectivity, the card reader 112 may include a plurality of electrical contacts to provide electrical connections to an inserted card 114. In another example, to provide wireless connectivity the card reader 112 may be compliant with at least a portion of the ISO/IEC 14443 specification as promulgated by the International Organization for Standardization (ISO) and the International Electrotechnical Commission (IEC, EMVCo, and so forth). In other implementations the card reader 112 may not be used during operation or may be omitted from the input device 102.

A stand 116 may be used to support the input device 102. In some implementations the stand 116 may be affixed to a surface. For example, the stand 116 may be attached to a countertop.

Figure 2:
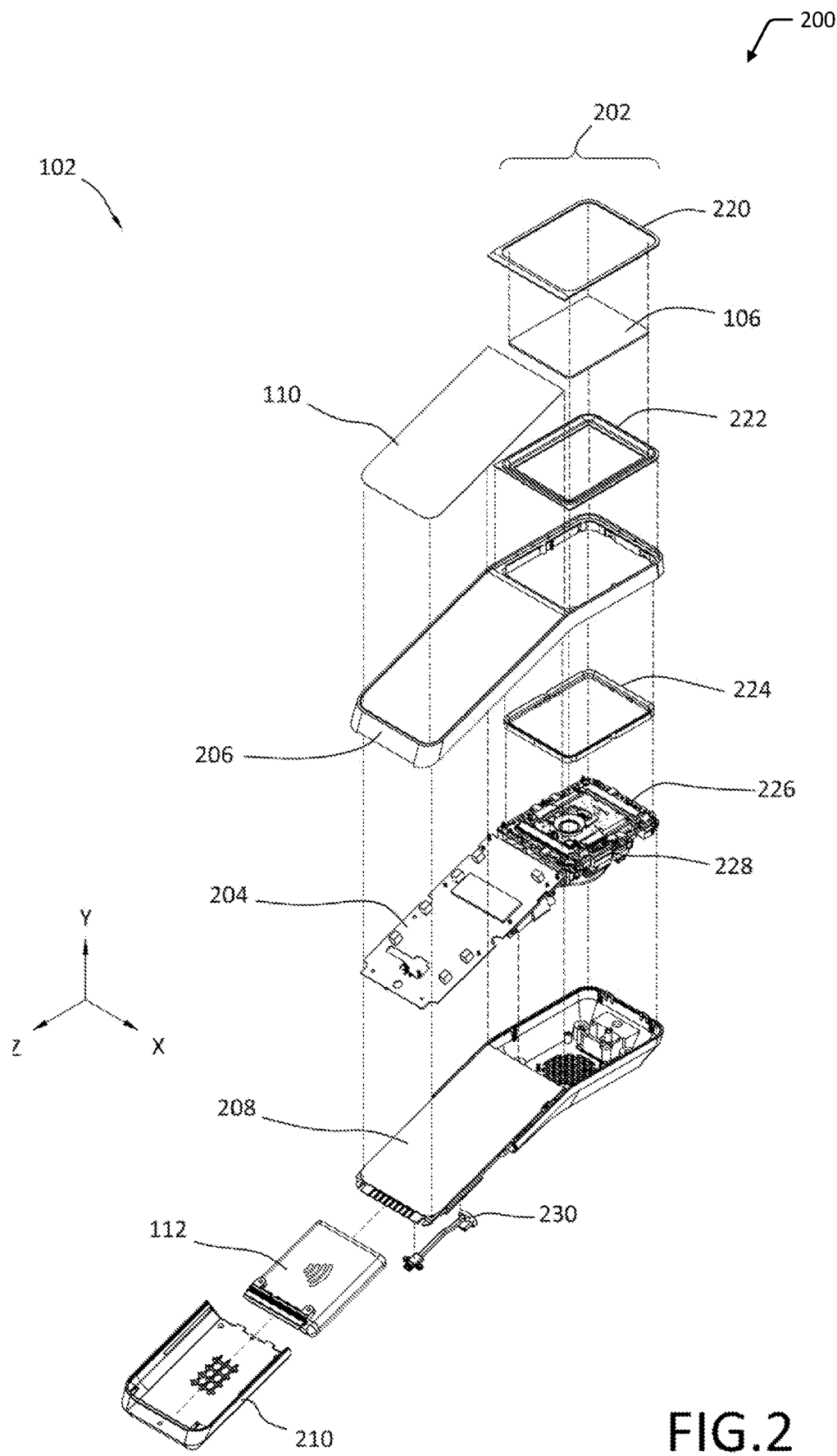
FIG. 2 illustrates an expanded view of the device with the interior components including a sensor assembly comprising an optical assembly, and a mainboard assembly, according to some implementations.

FIG. 2 illustrates an expanded view of the input device 102, according to some implementations. The internal components of the input device 102 include a sensor assembly 202 and a mainboard assembly 204. The sensor assembly 202 may include a distance sensor, a photodetector, a visible light camera, an infrared camera, light sources, polarizers, and so forth. During operation the sensor assembly 202 may be used to obtain non-biometric input such as an image of a machine-readable code presented on a printed card, biometric input such as images of the hand 104, and so forth. The mainboard assembly 204 may include the card reader 112, one or more processors, memory, output devices, controllers, other input devices, and so forth.

The input device 102 may include an upper housing 206, a middle housing 208, and a lower housing 210. When assembled, the sensor assembly 202 and the mainboard assembly 204 are at least partially enclosed within the upper housing 206, the middle housing 208, and the lower housing 210. The stand 116 is also shown attached to an underside of the lower housing 210.

The sensor assembly 202 of the input device 102 comprises a sensor window bezel 220 that extends around a perimeter of the sensor window 106. In some implementations, the sensor window bezel 220 may be used to retain one or more components of the input device 102.

The sensor assembly 202 may include a visible light diffuser 222. The visible light diffuser 222 diffuses light produced by one or more visible light sources of an optical assembly 226. The visible light diffuser 222 may be arranged around at least a portion of a perimeter of the sensor window 106. In one implementation, the visible light diffuser 222 may be adjacent to the sensor window bezel 220.

The visible light emitted by the visible light sources may be conveyed from the optical assembly 226 to the visible light diffuser 222 by a visible light pipe 224. For example, the visible light pipe 224 may comprise a material that is transparent to visible light, and directs light from a light source such as a light emitting diode (LED) on the optical assembly 226 to the visible light diffuser 222 using internal reflection, diffraction, and so forth.

The optical assembly 226 may comprise a circuit board, one or more of the sensors, and so forth. The optical assembly 226 is discussed in more detail in the following figures.

The sensor assembly 202 may include a fan 228 to dissipate heat generated by components during operation. For example, the fan 228 may be used to dissipate the heat resulting from operation of the light sources. The fan 228 may also provide cooling to other portions of the input device 102 as well. For example, the fan 228 may provide cooling air to the mainboard assembly 204.

The card reader 112 is also shown. The input device 102 may use one or more flexible printed circuits (FPCs) 230. The card reader 112 may be connected to the mainboard assembly 204 using a first FPC 230(1). One or more of the FPCs 230 in the input device 102 may include one or more antitamper features. For example, the first FPC 230(1) may include a tamper detection mesh.

The input device 102, or portions thereof, may include antitamper features. The antitamper features may be used to disable at least a portion of the input device 102 if unauthorized entry to the input device 102 is attempted. For example, the card reader 112 may be encapsulated within an enclosure with one or more electrical conductors. Breakage of the one or more electrical conductors may be registered as an attempt at tampering. In some implementations, closure of an electrical circuit may be registered as an attempt at tampering. For example, closure of a switch may indicate tampering. Other techniques may be used to determine physical tampering such as detectors for ionizing radiation to determine if the device is being x-rayed. A determination of potential or actual tampering may result in mitigating actions including, but not limited to memory erasure, self-destruction, and so forth.

Figure 3A:
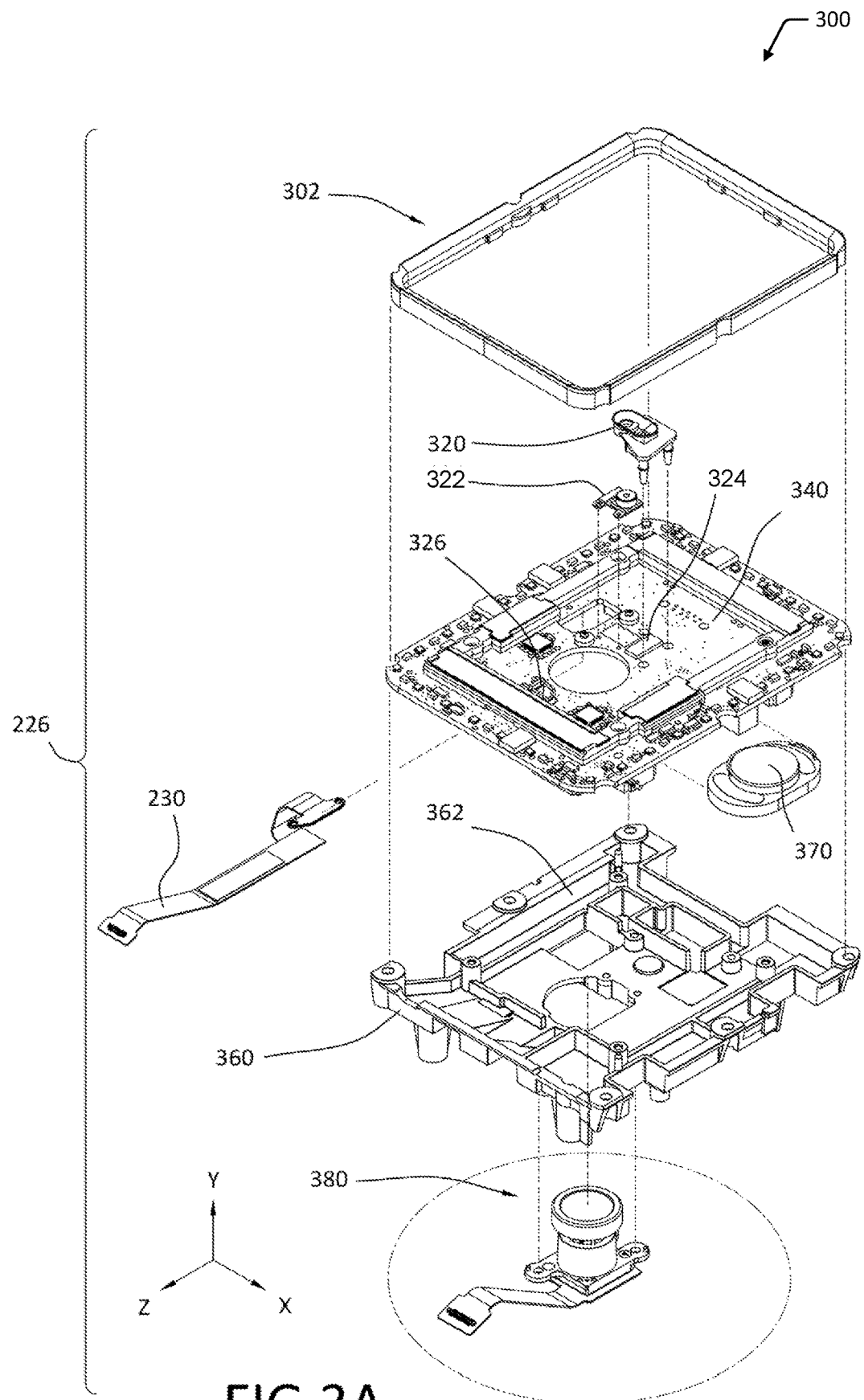
FIGS. 3A-3B illustrate an expanded view of the optical assembly including an infrared camera, according to some implementations.

FIG. 3A illustrates an expanded view 300 of the optical assembly 226 of the sensor assembly 202, according to some implementations. The optical assembly 226 includes an infrared diffuser and polarizer (IDP) assembly 302. The IDP assembly 302 may include one or more diffusers and polarizers to provide particular polarizations of infrared light, as described below. By operating different infrared light sources, the FOV 108 may be illuminated with a specified polarization of infrared light at particular times.

The optical assembly 226 may include one or more boots to prevent light leakage. A boot 320 provides an opaque barrier to prevent light leakage between the outside environment and the interior of the optical assembly 226. This is discussed in more detail with regard to FIG. 5.

The optical assembly 226 may include a visible light camera 322 that comprises a visible light image sensor to generate visible light image data. The visible light camera 322 may comprise a monochrome visible light image sensor or a color visible image light image sensor. For example, the color visible light image sensor may generate data indicative of red, green, and blue light intensities. The visible light camera 322 may have a FOV that includes at least a portion of the FOV 108.

The optical assembly 226 may include one or more photodetectors 324. The photodetector 324 may comprise a photodiode that is sensitive to one or more wavelengths. For example, the photodetector 324 may be sensitive to a range of wavelengths that consist of visible light. In another example, the photodetector 324 may be sensitive to a range of wavelengths that consist of visible light and infrared light. The photodetector 324 provides sensor data that is indicative of an intensity of light impinging upon the photodetector 324. For example, the photodetector 324 may comprise a "BPW 21" silicon photodiode from OSRAM Opto Semiconductors, GmbH.

The photodetector 324 provides intensity data indicative of incident light with an extremely short response time. For example, the photodetector 324 may provide an analog output signal that changes in microseconds. In one implementation, the analog output signal may be processed to provide intensity data every 50 microseconds. In comparison, the visible light camera 322 has a relatively long response time. For example, the visible light camera 322 may provide visible light image data every 25 milliseconds (or 25,000 microseconds). As a result, the photodetector 324 is able to observe distinct phenomena that have occurred more quickly than the visible light camera 322 may be able to detect.

The optical assembly 226 may include one or more distance sensors 326. The distance sensor 326 may be arranged with its respective field-of-view to include at least a portion of the FOV 108. In other implementations, the one or more distance sensor(s) 326 may be placed in other locations. For example, a distance sensor 326 may be located on the mainboard assembly 204.

The distance sensor(s) 326 may be used to determine if an object, such as a hand 104, is within the FOV 108. An optical distance sensor 326 may use time-of-flight (ToF), structured light, optical parallax, interferometry, or other techniques to determine if an object is present and distance data indicative of a distance to at least a portion of the object. For example, an optical parallax distance sensor 326 may use at least two cameras separated by a known distance to obtain images of the object and determine a position of the object based on the disparity of position of the object in the images. The optical distance sensor 326 may use infrared light during operation. For example, an infrared optical ToF sensor determines a propagation time (or "round-trip" time) of a pulse of emitted infrared light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor such as a camera. Based on an apparent distance between the features of the structured light pattern, the distance to the object may be calculated. Other techniques may also be used to determine distance to the object. In another example, the color of the reflected light may be used to characterize the object, such as skin, clothing, and so forth.

Distance sensors 326 using other phenomena may also be used instead of or in addition to optical distance sensors 326. For example, a capacitive sensor may determine proximity of an object based on a change in capacitance at an electrode. In another example, an ultrasonic sensor may use one or more transducers to generate and detect ultrasonic sound. Based on the detection of reflected sounds, information such as presence of an object, distance to the object, and so forth may be determined.

The optical assembly 226 may include a circuit board 340. In the implementation shown, the visible light camera 322, the photodetector 324, and the distance sensor 326 may be mounted to the circuit board 340. One or more light sources may also be mounted to the circuit board 340. The circuit board 340 is discussed in more detail with regard to FIG. 4.

One or more FPCs 230 may be used to provide connectivity between the mainboard assembly 204, the sensor assembly 202, and so forth. For example, a second FPC 230(2) may connect the infrared camera 380 to the mainboard assembly 204. In another example, a third FPC 230(3) may connect the circuit board 340 to the mainboard assembly 204.

The circuit board 340 may be mounted to a support structure 360. For example, the support structure 360 may comprise metal, plastic, ceramic, and so forth. In some implementations, one or more antennas 362 may be supported by the support structure 360. For example, a WiFi antenna may be affixed to a support structure 360 that comprises a non-conductive material. In some implementations, other components may be affixed to or otherwise supported by the support structure 360. For example, a speaker 370 may be attached to the support structure 360.

An infrared camera 380 is also shown. The infrared camera 380 may be affixed to the support structure 360. A portion of the infrared camera 380 may extend upward through a hole in the circuit board 340.

Figure 3B:
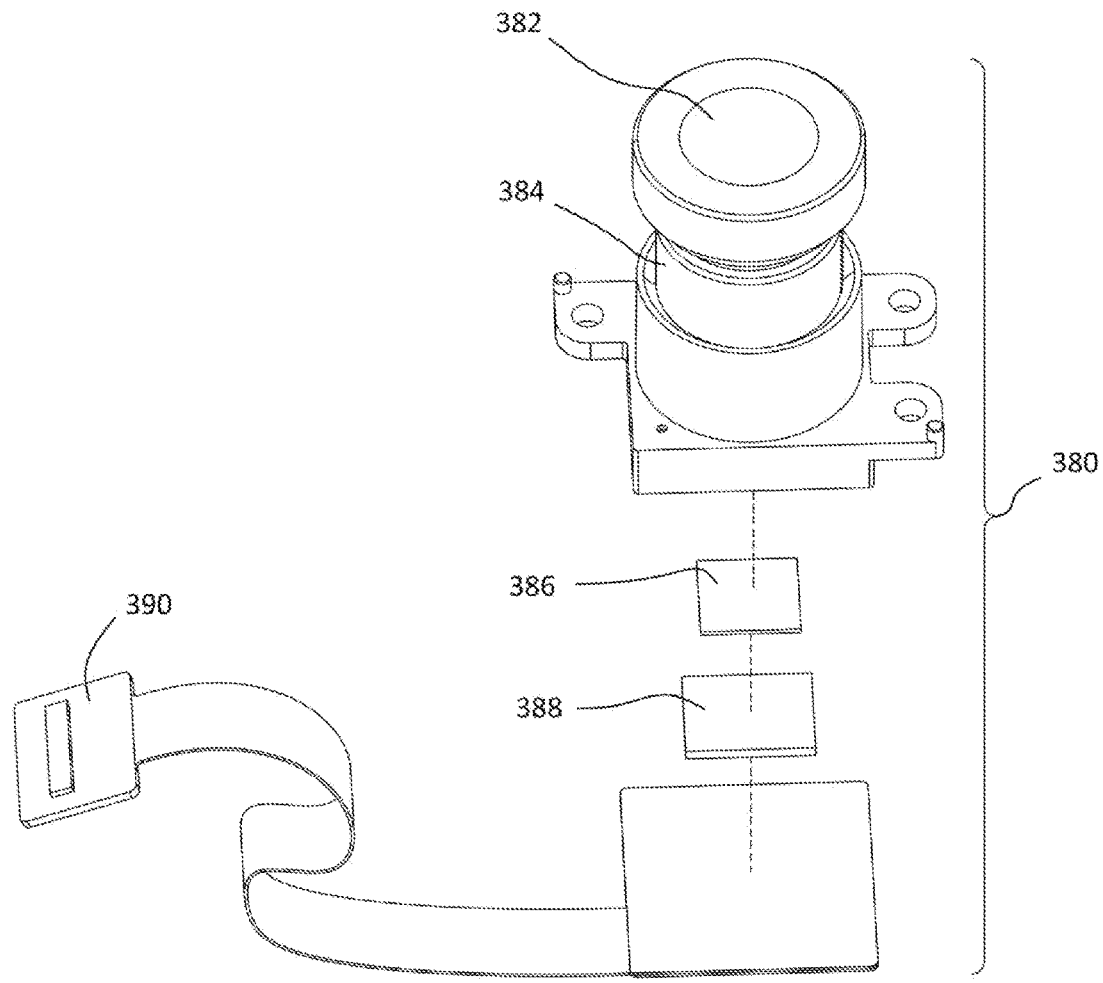

FIG. 3B illustrates an expanded view of the infrared camera 380. The infrared camera 380 may include a lens 382, lens body 384, polarizer 386, and an infrared image sensor 388. In this illustration, light from the FOV 108 enters the infrared camera 380 through an aperture that includes the lens 382. In other implementations, a pinhole may be used to allow for entry of light from the FOV 108. Other lenses or components (not shown) may be present in the optical path that extends from the FOV 108 to the infrared image sensor 388. For example, an optical bandpass filter may be included the optical path. The optical bandpass filter may be configured to pass the wavelength of light generated by the infrared light sources 420. For example, the optical bandpass filter may be transmissive to wavelengths of between 790 nm to 900 nm. In another example, a shutter may be present in the optical path. During operation, the light reaching the infrared image sensor 388 is limited to light with a particular polarization, as restricted by the polarizer 386 in the optical path.

The polarizer 386 may comprise a dichroic material or structure that passes light with a linear polarization. For example, the polarizer 386 may comprise aligned polyvinylene chains, silver nanoparticles embedded in a transparent substrate such as glass, and so forth. In other implementations, other polarization devices may be used, including but not limited to wire-grid polarizers, beam-splitting polarizers, quarter-wave plates, liquid crystals, photoelastic modulators, and so forth. For example, the photoelastic modulator may comprise a device that is controlled by an electrical signal which drives a piezoelectric transducer to vibrate a half wave resonant bar, such as fused silica. By changing the frequency of the signal, the frequency of the vibration produced by the transducer is changed, and the polarization of light through the resonant bar may be selected.

A second FPC 390 connects the infrared image sensor 388 or any associated electronics to the mainboard assembly 204. The second FPC 390 may include one or more traces for transferring power, data, control, and other signals between the electronics in the infrared camera 380 and the mainboard assembly 204. The second FPC 390 may also include one or more antitamper features. For example, the second FPC 390 may include one or more additional layers of an antitamper trace or security mesh, a tamper detection cover, and so forth. An attempt to physically compromise the second FPC 390 may be detected by breakage of the trace or security mesh.

The polarizer 386 may be fixed or variable. A static polarizer is fixed at time of assembly. The polarizer 386 may comprise a wire-grid polarizer or other structure that passes light with a linear polarization. Materials such as a dichroic material may be used. For example, the polarizer 386 may comprise aligned polyvinylene chains, silver nanoparticles embedded in a transparent substrate such as glass, and so forth. In other implementations, other polarization devices may be used, including but not limited to beam-splitting polarizers, quarter-wave plates, liquid crystals, photoelastic modulators, and so forth.

A variable polarizer 386 allows for control over the polarization selected based on an input. This allows the variable polarizer 386 to change between the first polarization and the second polarization on command from a controller or other electronics. For example, a variable polarizer 386 may comprise a photoelastic modulator that is controlled by an electrical signal which drives a piezoelectric transducer to vibrate a half wave resonant bar, such as fused silica. By changing the frequency of the signal, the frequency of the vibration produced by the transducer is changed, and the polarization of light through the resonant bar may be selected. In another implementation the variable polarizer 386 may comprise a mechanically switchable polarizer that includes two or more different static polarizers that may be selectively inserted into the optical path. For example, one or more actuators such as linear motors, rotary motors, piezoelectric motors, and so forth may be used to move a first static polarizer to be in the optical path, or switch to a second static polarizer in the optical path. The first static polarizer may have the first polarization while the second static polarizer has the second polarization. In yet another implementation, the mechanically switchable polarizer may rotate a static polarizer from a first orientation to a second orientation.

In another implementation a pair of infrared image sensors 388 sharing a common aperture may be used. Light with a first polarization is directed to a first infrared image sensor 388(1) while light with a second polarization is directed to a second infrared image sensor 388(2). Incoming light through a common aperture is directed to the respective infrared image sensors 388 by one or more optical elements. For example, a dichroic mirror may be used to direct light with the first polarization towards the first infrared image sensor 388(1) and light with the second polarization towards the second infrared image sensor 388(2). The first infrared image sensor 388(1) and the second infrared image sensor 388(2) may be operated to generate respective image data at the same time, during overlapping times, or at different times.

In yet another implementation, a pair of infrared image sensors 388 may be used that are placed adjacent to one another. A first polarizer passes light with a first polarization to a first infrared image sensor 388(1). A second polarizer passes light with a second polarization to a second infrared image sensor 388(2). The first infrared image sensor 388(1) and the second infrared image sensor 388(2) may be operated to generate respective image data at the same time, during overlapping times, or at different times. In some implementations, the resulting image data may be adjusted to compensate for the difference in point of view between the first infrared image sensor 388(1) and second infrared image sensor 388(2). For example, image data from one image sensor 388 may be cropped and shifted by a fixed number of columns to produce aligned image data.

The infrared image sensor 388 is configured to detect infrared light that includes the wavelength(s) emitted by the infrared light sources 420. The infrared image sensor 388 may comprise charge coupled devices (CCD), complementary metal oxide semiconductor (CMOS) devices, microbolometers, and so forth.

The mainboard assembly 204 may include electronics that operate the visible light source(s) 402, operate the infrared light source(s) 420, operate the distance sensor(s) 326, operate the visible light camera 322, operate the infrared image sensor 388, and so forth. For example, the distance sensors 326 may operate to detect the presence of an object, such as a hand 104 in the FOV 108. When the distance sensor(s) 326 detects a presence of an object, the visible light sources 402 may be activated at different times to provide illumination with visible light with different colors. The photodetector 324 may be used to acquire sensor data indicative of the intensity at the respective times that may be used to characterize the object. For example, one or more of the visible light sources 402 may be operated to emit violet light for 100 microseconds, followed by red light for 100 microseconds, and so forth. The intensity data provided by the photodetector 324 at these respective times may be used to determine reflectance of the colors of visible light. Based on the intensity data, the object may be determined to be part of a user, such as the hand 104.

The electronics of the mainboard assembly 204 may operate the infrared light sources 420 at different times to provide illumination with infrared light having a particular polarization, while the infrared image sensor 388 acquires images at the different times.

The biometric input may comprise images of the object within the FOV 108 as illuminated by infrared light with different polarizations at different times. For example, a first set of one or more images may be obtained that use infrared light with a first polarization and a second set of one or more images may be obtained that use infrared light with a second polarization. When an object such as the hand 104 is illuminated with infrared light having the same polarization as that of the polarizer 386 in the optical path of the infrared image sensor 388, surface features predominate in the resulting image. This is because most of the reflected infrared light has the same polarization due to reflection. In comparison, when the illumination uses a different polarization from the polarizer 386, the scattering from those internal features changes the polarization of the reflected light. As a result, internal anatomical structures, such as veins, bones, soft tissue, or other structures beneath the epidermis of the skin predominate in the resulting image.

The resulting biometric input may be processed and used for biometric identification. The combination of different sets of one or more images that depict predominately surface and predominately deeper anatomical features provide more detail. This increased detail may be used to improve the accuracy of identification, reduce the effect of surface changes impairing identification, and so forth.

In some implementations, the biometric input may include data from other sensors as well. For example, the biometric input may comprise data acquired by the visible light camera 322, the photodetector 324, and so forth. For example, the biometric input may comprise visible light image data.

Figure 4:
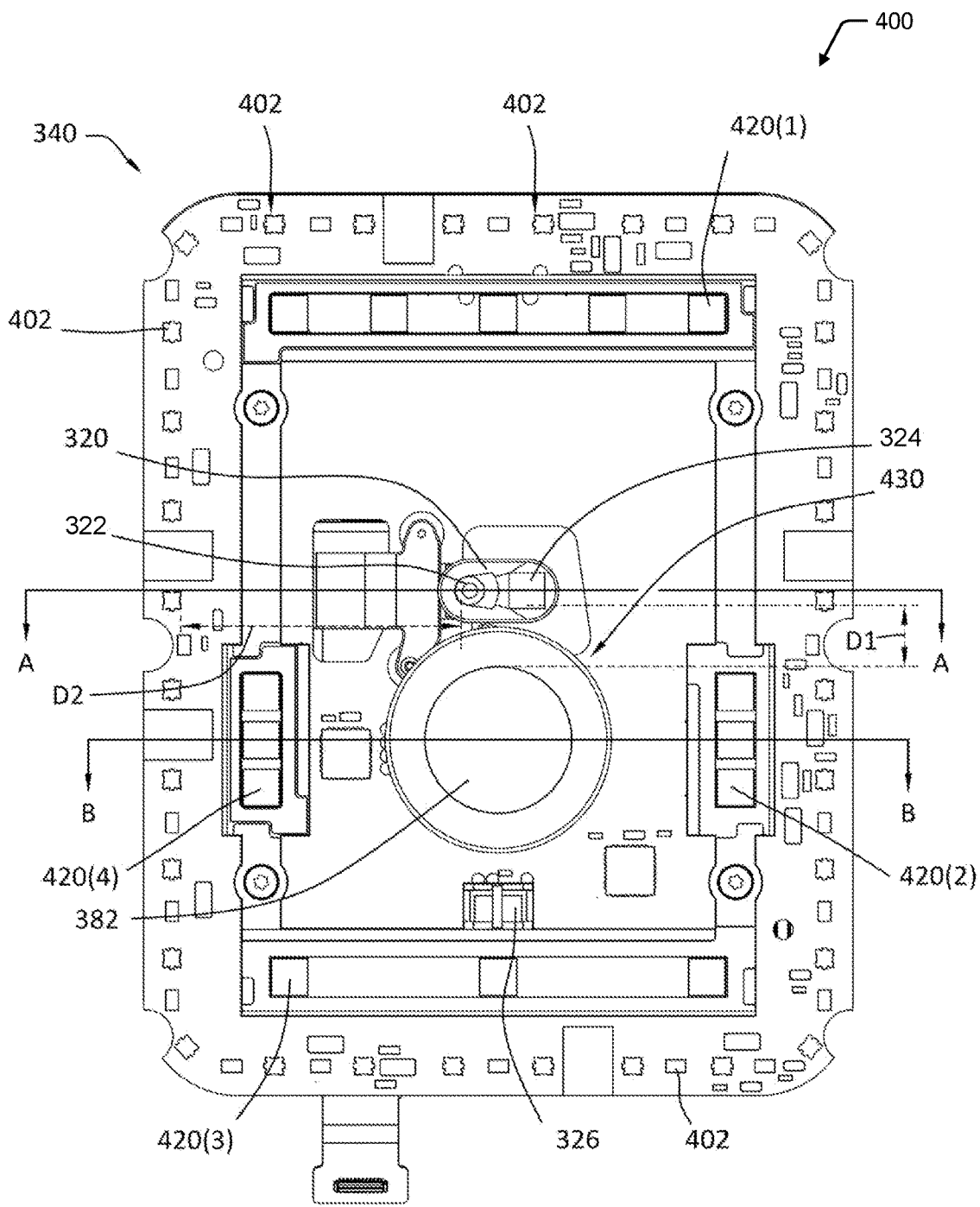
FIG. 4 illustrates a plan view of a circuit board of the optical assembly, according to some implementations.

FIG. 4 illustrates a plan view 400 of the circuit board 340 of the optical assembly 226, according to some implementations.

The circuit board 340 may include one or more visible light sources 402. For example, the visible light sources 402 may comprise light emitting diodes (LEDs), quantum dots, electroluminescent devices, fluorescent devices, lamps, lasers, and so forth. In this illustration, the visible light sources 402 comprise a plurality of LEDs that are placed around a perimeter of the circuit board 340. The visible light sources 402 are located to correspond with the visible light pipe 224 in the assembled input device 102. At least a portion of the visible light emitted by the visible light sources 402 is directed by the visible light pipe 224 to the visible light diffuser 222, where the visible light is then emitted into the FOV 108.

During operation, the visible light sources 402 emit light with one or more colors. The visible light sources 402 may comprise various combinations of multi-color LEDs and single-color LEDs. For example, the visible light sources 402 may include multi-color LEDs capable of emitting red, green, and blue light as well as single-color LEDs capable of emitting violet light. The light emitted by the visible light sources 402 may be monochromatic or may have a spectral curve that includes wavelengths dispersed across some range. For example, the green light emitted may include wavelengths from 500 to 560 nanometers with a peak intensity at 530 nanometers.

In one implementation, the visible light sources 402 may be arranged around the perimeter with alternating colors. For example, on the circuit board 340 the arrangement may be 402(1) RGB LED, 402(2) violet LED, 402(3) RGB LED, 402(4) violet LED, and so forth.

During operation, the visible light sources 402 may be operated to provide for one or more of spatial or color differentiation.

Spatial differentiation results in illumination of an object within the FOV 108 from a specified direction. For example, at a first time the visible light sources 402 located on a first side of the circuit board 340 may be operated to provide illumination from the first side. Continuing the example, at a second time the visible lights sources 402 located on a second side of the circuit board 340 may be operated to provide illumination from the second side.

The electronics may operate a plurality of visible light sources 402 to emit the same color of light at the same time. For example, during a first time all of the multicolor LEDs may be operated to emit green light. Continuing the example, during a second time, all of the violet LEDs may be operated to emit violet light.

Color differentiation results in illumination of an object within the FOV 108 with one or more specified colors. For example, at a first time the visible light sources 402 may be operated to emit red light, at a second time they are operated to emit green light, at a third time they are operated to emit blue light, and at a fourth time they are operated to emit violet light. Continuing the examples, the red, green, and blue light may be provided by a multi-color LED, while other colors are provided by dedicated LEDs, such as a violet LED. In other implementations other multi-color devices may be used. For example, the visible light sources 402 may comprise a red, green, blue, violet multicolor LED. In another example, the visible light sources 402 may comprise a red, green, blue, amber LED.

The circuit board 340 may also include one or more infrared light sources 420. For example, the infrared light sources 420 may comprise LEDs, quantum dots, electroluminescent devices, fluorescent devices, lamps, lasers, and so forth. Continuing the example, the infrared light sources 420 may comprise LEDs that emit light with a wavelength of between 740 nm and 1000 nm. In one implementation the IR light sources 420 may emit infrared light at 850 nm.

The infrared light sources 420 are located on the circuit board 340 to correspond with the infrared diffuser and polarizer assembly 302 in the assembled input device 102. By selectively operating particular infrared light sources 420, infrared light with a specified polarization may be emitted to illuminate the FOV 108. This provides polarization differentiation of the emitted infrared light. For example, at a first time a first infrared light source 420(1) is operated to emit first infrared light. A portion of the first infrared light passes through a first portion of the infrared diffuser and polarizer assembly 302 to be emitted into the FOV 108 with a first polarization. Continuing the example, at a second time a second infrared light source 420(2) is operated to emit second infrared light. A portion of the second infrared light passes through a second portion of the infrared diffuser and polarizer assembly 302 to be emitted into the FOV 108 with a second polarization.

One or more sensors may be mounted to the circuit board 340. In the implementation shown, the visible light camera 322, the photodetector 324, and the distance sensor 326 are shown. Also shown is the aperture in the circuit board 340 to provide a path for the infrared camera 380 to view the FOV 108. The sensors may be arranged generally along a centerline of the circuit board 340, as shown here. In other implementations, one or more sensors may be placed in different locations on the circuit board 340 or on the input device 102. For example, the distance sensor 326 may be part of the mainboard assembly 204.

The photodetector 324 and the infrared camera 380 may be arranged on the circuit board 340 such that there is a distance D1 between them. Likewise, there is a distance D2 between the photodetector 324 and the nearest visible light sources 402 on the circuit board 340. These distances may increase the difficulty associated with providing false data to the input device 102. In one implementation, output from the photodetector 324 may be used to determine whether the object in the FOV 108 is living tissue or a fabricated artifact such as a casting of a hand. The D2 in particular results in the sensor data from the photodetector 324 being associated with a larger volume of the FOV 108. For example, the photodetector 324 may be mounted at least one centimeter from any of the one or more visible light sources 402 that are used in conjunction with the photodetector 324. In this example, an object within the FOV 108 that is being assessed based on the output from the photodetector 324 would need to be illuminated by the visible light source 402. However, the distance D2 prevents an attempt to subvert this determination. Continuing the example, placement of living tissue such as a thumb on the sensor window 106 directly over the photodetector 324 would fail as that thumb would not be illuminated by the visible light source 402. Trying to hold the thumb far enough from the sensor window 106 to produce suitable output would then result in the thumb itself occluding part of the FOV 108, occluding the fabricated artifact. As a result, distance D2 improves the ability of the input device 102 to resist attempts to present false input. The distance D2 may be larger than one centimeter in some implementations. For example, D2 may be at least one half an expected width of a palm of a hand of a user. Continuing the example, if an expected width of a user's hand is 10 centimeters, D2 may be at least 5 centimeters.

In other implementations other quantities and arrangements of the various components may be used. For example, a different quantity of visible light sources 402, infrared light sources 420, distance sensors 326, and so forth may be used. While the entry for light of the infrared camera 380 is arranged generally in the center of the sensor assembly 202, in other implementations the infrared camera 380 may be off center, the arrangement of infrared light sources 420 may be asymmetrical, and so forth.

Figure 5:
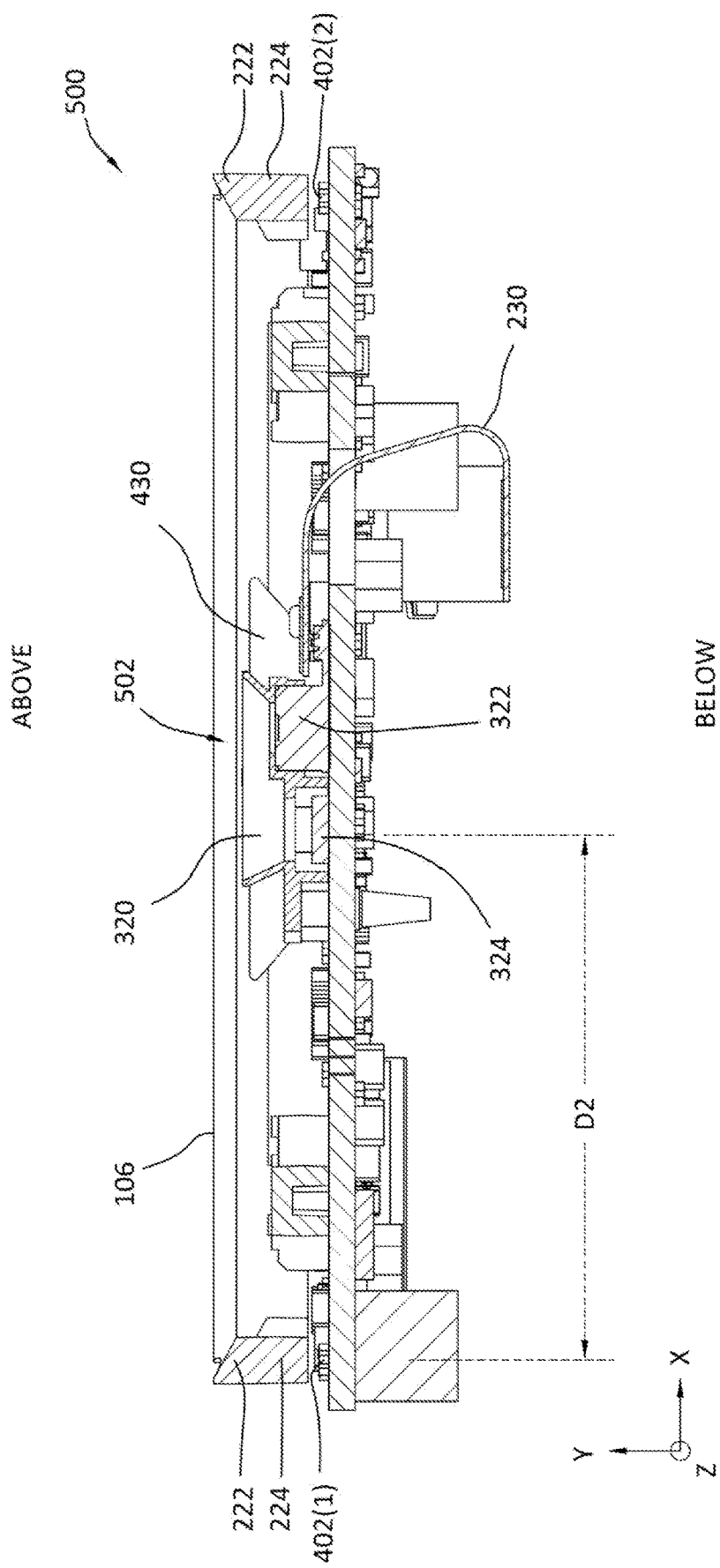
FIG. 5 illustrates a cross section of a portion of the sensor assembly including a visible light camera and photodetector, according to some implementations.

FIG. 5 illustrates a cross section 500 of a portion of the sensor assembly 202 including the visible light camera 322 and the photodetector 324 along line A-A of FIG. 4, according to some implementations.

In this illustration, the circuit board 340 is shown with the first visible light source 402(1) proximate to a first side of the circuit board 340 and a second visible light source 402(2) proximate to a second side of the circuit board 340. Also shown is the visible light camera 322 and the photodetector 324. The distance D2 between the photodetector 324 and the nearest visible light source 402 that is used in conjunction with the photodetector 324 is also shown. The sensor window 106 may be transparent to infrared light and opaque to visible light. To allow for the operation of the visible light camera 322 and the photodetector 324, a visible light aperture 502 is present in the sensor window 106.

In one implementation, the sensor window 106 may comprise glass to which one or more coatings have been applied that are transmissive to infrared but block visible light. The portion of the sensor window 106 that comprises the visible light aperture 502 may omit these one or more coatings to allow transmission of visible light. In another implementation, the visible light aperture 502 may comprise a hole in the sensor window 106. In yet another implementation, the sensor window 106 may comprise a first portion comprising an infrared transparent material such as a first plastic, and a second portion corresponding to the visible light aperture 502 that comprises a visible light transparent material such as a second plastic. For example, the sensor window 106 may be fabricated using multiple-shot injection molding techniques. In other implementations, the sensor window 106 may be transparent to one or more of visible light or infrared light.

The boot 320 provides an opaque barrier to prevent light leakage between the outside environment and the interior of the optical assembly 226. The boot 320 may be opaque to visible light, infrared light, and so forth. The boot 320 may comprise an elastomeric material, such as an opaque foam. In some implementations the boot 320 may comprise one or more structures that extend from, or are affixed to, one or more of the circuit board 340, the visible light camera 322, the photodetector 324, and so forth.

A second boot 430 is also visible. The second boot 430 is associated with the infrared camera 380. The second boot 430 is discussed in more detail with regard to FIG. 6.

During operation of the input device 102, electronics operate one or more of the visible light camera 322, the photodetector 324, the visible light source(s) 402, and so forth. In one implementation, one or more of the visible light sources 402 may be operated to emit light of different colors at different times. During those different times, intensity data may be generated by the photodetector 324. While the photodetector 324 may be able to indicate the intensity of light impinging on an active portion of the photodetector 324, the photodetector 324 may be unable to determine the color of incident light. By selectively operating the visible light sources 402 to emit a particular color during a first time, the resulting intensity data from the photodetector 324 acquired during that first time may be considered representative of the reflectance of the object in the FOV 108.

In one implementation, the electronics of the input device 102 operate one or more of the visible light sources 402 to illuminate the at least a portion of the first FOV 108 with a first color at a first time, a second color at a second time, a third color at a third time, and a fourth color at a fourth time. Meanwhile, the electronics of the input device 102 operate the photodetector 324 to determine sensor data comprising: a first intensity during the first time, a second intensity during the second time, a third intensity during the third time, and a fourth intensity during the fourth time. As a result of the coordination between operating the visible light sources 402 to emit particular colors at the specified times, the intensity data may be deemed to be indicative of an intensity of a particular color. For example, if the first color is red then the first intensity is indicative of the intensity of red light received at the first time. Continuing the example, if the second color is green, then the second intensity is indicative of the intensity of green light received at the second time. Similarly, the third color may be blue and the fourth color may be violet.

A temporal sequence of which colors are emitted at different times may vary. For example, a first sequence may be red, green, blue, violet. A second sequence may green, violet, blue, red. The electronics in the input device 102, knowing the order in which the visible light sources 402 are operated, are then able to produce intensity data that is associated with a particular color.

In implementations where the photodetector 324 is insensitive to the wavelengths of infrared light produced by the infrared light sources 420, the photodetector 324 may be used to produce sensor data while the infrared light sources 420 are emitting infrared light. The electronics of the input device 102 may operate the infrared image sensor 388 to acquire first image data at a first time, and also operate the photodetector 324 to acquire intensity data at the first time. For example, during the first time the visible light source 402 may be operating to illuminate the hand 104 while the photodetector 324 is providing intensity data. Meanwhile, at the same time, the infrared light source 420 may be illuminating the hand 104 while the infrared camera 380 is providing infrared image data.

The photodetector 324 may also be operated at the same time as the visible light camera 322. For example, the visible light camera 322 may provide visible light image data while the photodetector 324 is providing intensity data. This contemporaneous operation is facilitated by the difference in response times between the photodetector 324 and the visible light camera 322. For example, the photodetector 324 may generate intensity data based on a 50 microsecond sample time while the visible light camera 322 provides visible light image data every 25 milliseconds (or 25,000 microseconds). To the visible light camera 322, the changing colors of light produced by the visible light source 402 are integrated over the relatively long time and may appear as white light. The photodetector 324 with the faster response time is able to provide data about intensity corresponding to the particular color emitted at a particular time by the visible light source 402.

Figure 6:
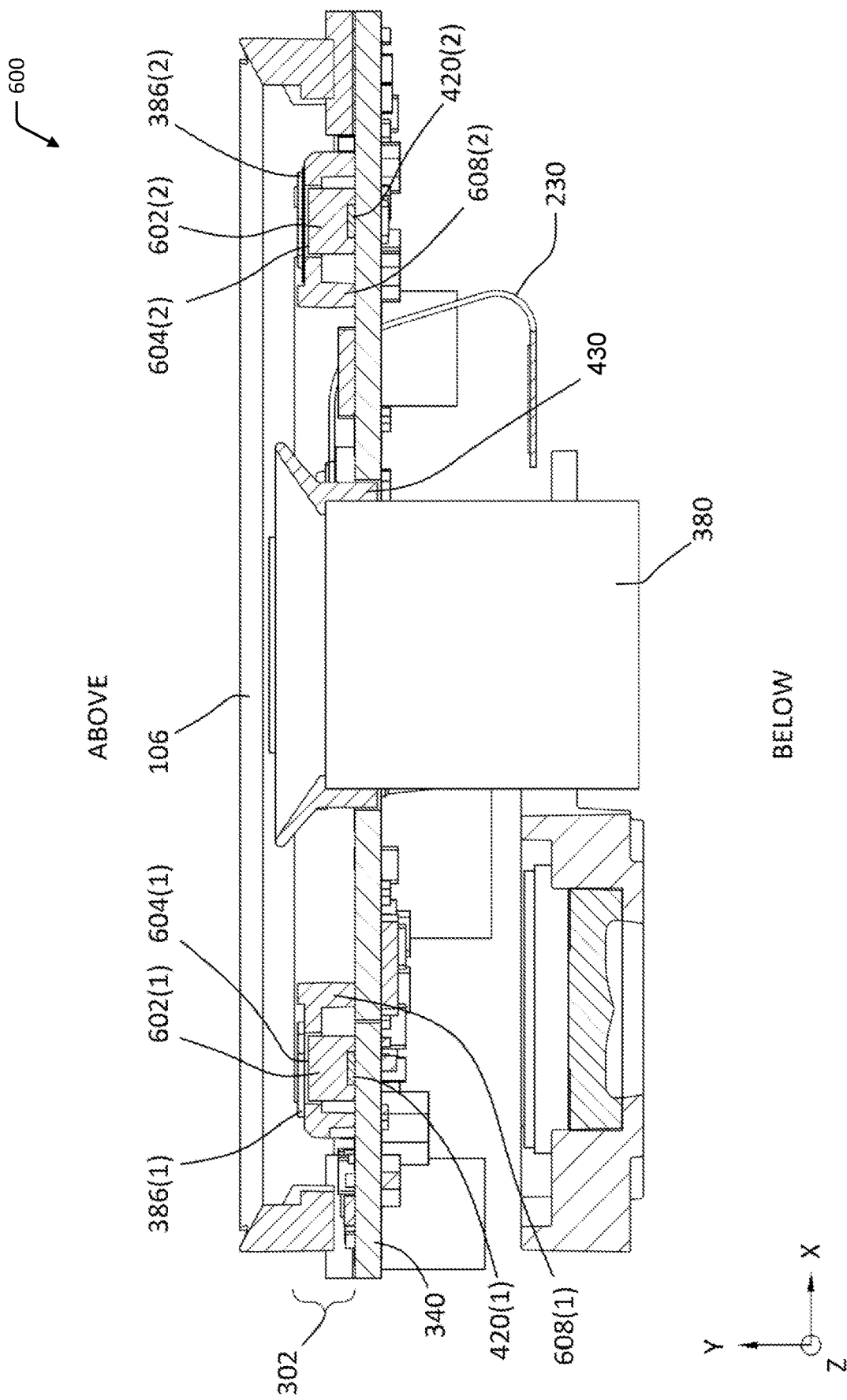
FIG. 6 illustrates a cross section of a portion of the sensor assembly including an infrared camera and infrared light sources with polarizers to provide polarized infrared light, according to some implementations.

FIG. 6 illustrates a cross section 600 of a portion of the sensor assembly 202 including an infrared camera 380 and infrared light sources 420 with polarizers 386 to provide polarized infrared light along line B-B of FIG. 4, according to some implementations.

The circuit board 340 is shown with the first infrared light source 420(1) proximate to the first side of the circuit board 340 and a second infrared light source 420(2) proximate to the second side of the circuit board 340. The infrared camera 380 is mounted below the sensor window 106. The sensor window 106 may be transparent to infrared light. In some implementations the sensor window 106 may be opaque to visible light.

Also shown is the infrared diffuser and polarizer assembly 302 that distributes at least a portion of the light from the infrared light source(s) 420 to illuminate the FOV 108 with a particular polarization of infrared light. The infrared diffuser and polarizer 302 may comprise an infrared light pipe 602, an infrared diffuser 604, and a polarizer 386.

The infrared light pipe 602 may comprise a material that is transparent to infrared light and directs infrared light from the infrared light source 420 to the infrared diffuser 604 using internal reflection, diffraction, and so forth.

In one implementation, the infrared diffuser 604 may comprise a micro lens array (MLA) that diffuses light while maintaining the polarization of infrared light passing through. In another implementation, the infrared diffuser 604 may change the polarization.

In implementations where the infrared diffuser 604 may change polarization, the infrared diffuser 604 is arranged above the infrared light pipe 602 and below the polarizer 386, as shown in this figure. In implementations where the infrared diffuser 604 maintains polarization, the infrared diffuser 604 may be arranged above the polarizer 386.

During operation of the input device 102 electronics operate the infrared light source(s) 420 and the infrared camera 380. By operating different infrared light sources 420 that are associated with different polarizers 386, a particular polarization of infrared light may be used to illuminate the FOV 108 at a specified time. For example, at a first time the electronics operate a first infrared light source 420(1) that is associated with a first polarizer 386(1) having a first polarization. As a result, first infrared light emitted by a first infrared diffuser and polarizer assembly 302(1) will have a first polarization. Continuing the example, at a second time the electronics operate a second infrared light source 420(2) that is associated with a second polarizer 386(1) having a second polarization. As a result, second infrared light emitted by a second infrared diffuser and polarizer assembly 302(1) will have a second polarization. During the first time, the infrared camera 380 acquires a first infrared image. During the second time, the infrared camera 380 acquires a second infrared image.

In the implementation shown here, the infrared diffuser and polarizer assembly 302 is below the sensor window 106. In other implementations, at least a portion may extend above or through the sensor window 106.

One or more barriers 608 may also be included in the sensor assembly 202. These barriers 608 may be opaque to infrared light. The barriers 608 may be placed between adjacent portions of the infrared diffuser and polarizer assembly 302, between the IDP assembly 302 and at least a portion of the infrared camera 380, or at other locations within the input device 102. The barriers 608 prevent the light emitted from the IR light source 420 that remains within the input device 102 from entering an aperture of the infrared camera 380, such as a lens or pinhole. For example, the barriers 608 prevent infrared light emitted by the infrared light source 420 from "spilling over" and interfering with the light reflected from the hand 104. In one implementation the barriers may comprise a housing for portions of the IDP assembly 302. For example, each portion of the IDP assembly 302 that is associated with a particular polarization of infrared light may comprise a unit with a wall that acts as the barrier 608. In another implementation the barriers 608 may be affixed to, or extend from, the circuit board 340. In yet another implementation the barriers 608 comprise a structure of infrared opaque material that extends from the infrared camera 380 to the sensor window 106. For example, an infrared opaque boot 430 ("boot") or gasket of flexible material may be arranged between the infrared camera 380 and the interior surface of the sensor window 106. This boot 430 prevents reflections of infrared light that are inside the input device 102 from entering the aperture of the infrared camera 380.

Figure 7:
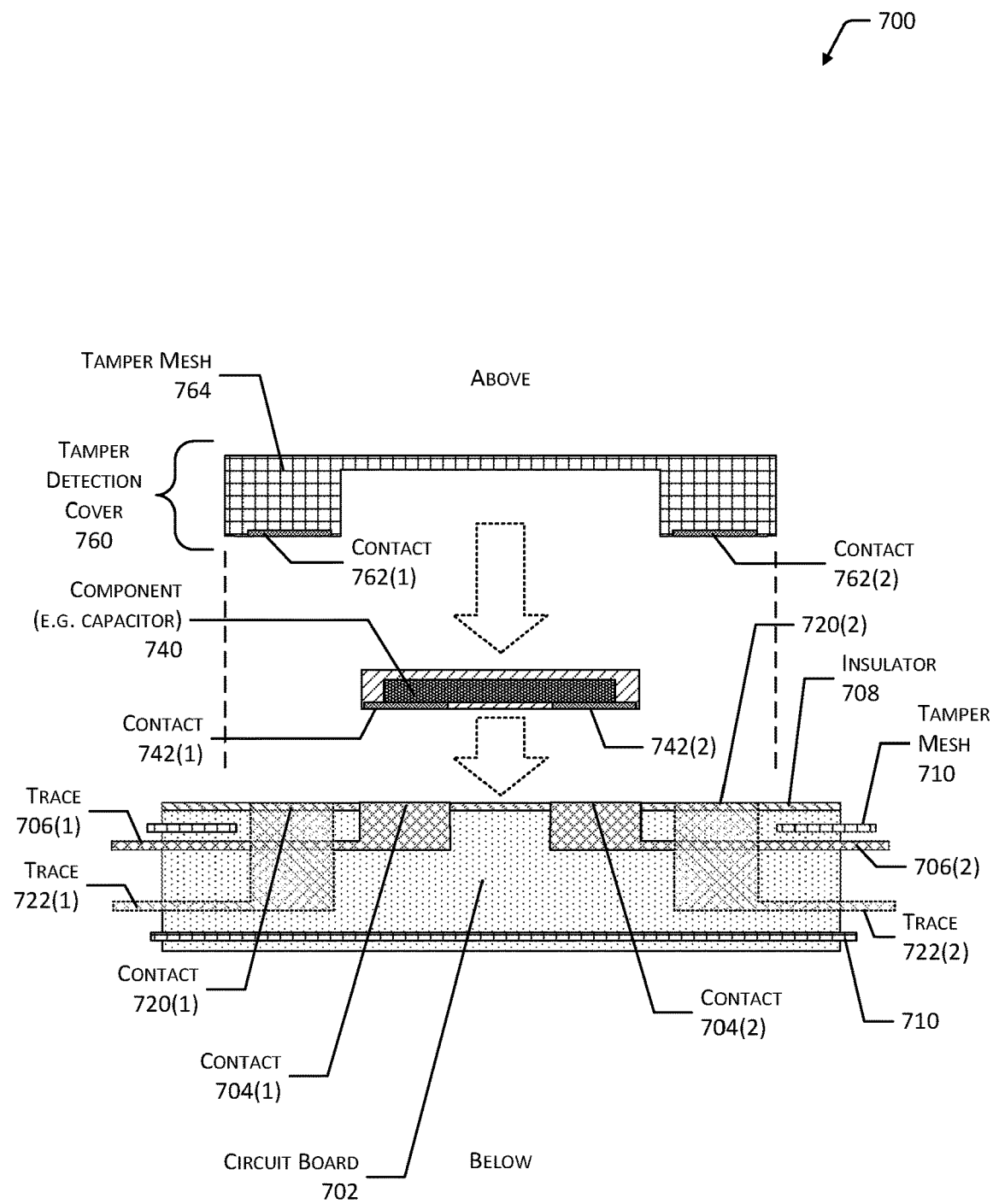
FIG. 7 illustrates a cross section of a tamper detection cover, according to some implementations.

FIG. 7 illustrates a cross section 700 of a tamper detection cover 760, according to some implementations. The input device 102 may include one or more features to mitigate tampering and maintain the security of the input device 102 and data stored within the input device 102, such as cryptographic keys.

Physical tampering may involve the use of test leads or electrodes that are applied to a trace or other conductor. Components that are exposed are particularly vulnerable to such tampering. This can be particularly troublesome for traces used for data communication. The specifications for data communication often call for some additional components to be present at the ends of the traces. For example, data communications using Universal Serial Bus (USB) may utilize blocking capacitors near the ends of the traces to block direct current. Traditionally these capacitors are mounted as a surface mount component. While inexpensive to do, this leaves the trace accessible to physical probing. Alternatively, the capacitor could be buried within a multi-layer circuit board. However, this may not be possible due to fabrication constraints, thermal dissipation concerns, and is also expensive.

A circuit board 702 comprises a first contact 704(1) and a second contact 704(2) on an upper surface. As used herein, a contact may comprise an electrically conductive surface such as a pad. The pad may be suitable for soldering. The first contact 704(1) provides an electrically conductive pathway to a first trace 706(1). The second contact 704(2) provides an electrically conductive pathway to a second trace 706(2). For example, the first trace 706(1) may connect to a first end of a USB connection, while the second trace 706(2) connects to a second end of the USB connection.

The circuit board 702 also comprises a third contact 720(1) and a fourth contact 720(2) on the upper surface. The contacts 720 may be proximate to the contacts 704. The third contact 720(1) provides an electrically conductive pathway to a third trace 722(1). The fourth contact 720(2) provides an electrically conductive pathway to a fourth trace 722(2). The third trace 722(1) and the fourth trace 722(2) may connect to tamper detection circuitry 860.

The circuit board 702 may include one or more antitamper devices, such as a tamper mesh 710. The tamper mesh 710 may comprise one or more electrically conductive traces. The tamper mesh 710 may be connected to the tamper detection circuitry 860. A break in the tamper mesh 710 that results in a change in the electrical conductivity may be determined to be indicative of a tampering event. The tamper mesh 710 may be arranged to provide a path for the contacts 704 and 720, or the vias that connect the contacts to their respective traces 706 or 722 associated therewith.

A component 740 may comprise a single discrete device or a combination of devices. For example, the component 740 may comprise a capacitor, integrated circuit, and so forth. The component 740 includes one or more contacts 742 to provide electrical connectivity to a contact 704 on the circuit board 702 once installed. In this illustration, the component 740 may comprise a capacitor having a fifth contact 742(1) and a sixth contact 742(2). During assembly, the component 740 is placed onto the circuit board, such that the fifth contact 742(1) is proximate to the first contact 704(1) and the sixth contact 742(2) is proximate to the second contact 704(2). One or more techniques may be used to join the component 740 to the circuit board 702 mechanically and electrically. For example, solder may be used to join two adjacent contacts. In another example, an adhesive may be used to join the component 740 to the circuit board 702 while physical contact between the contacts 704 and 742 provides an electrically conductive pathway.

A tamper detection cover 760 is then emplaced atop the component 740. The tamper detection cover 760 comprises a recess. Once assembled, the component 740 is within the recess. The tamper detection cover 760 may comprise a tamper mesh 764 that is connected to a seventh contact 762(1) and an eighth contact 762(2). During assembly, the tamper detection cover 760 is placed onto the circuit board 702 atop the component 740, such that the seventh contact 762(1) is proximate to the third contact 720(1) and the eighth contact 762(2) is proximate to the fourth contact 720(2). As above, the tamper detection cover 760 is then joined to the circuit board 702.

The electrically conductive pathway provided by the tamper mesh 764 may be monitored by the tamper detection circuitry 860. In the event of a break in the tamper mesh 764, such as occurring as a result of an attempt to probe the underlying component 740, a tamper detection event is detected and mitigating actions taken. For example, cryptographic keys stored in the input device 102 may be erased, physical destruction of one or more circuits may be performed, and so forth.

The tamper detection cover 760 allows for a simple and low-cost way to add tamper protection to components 740 that would otherwise be exposed. The tamper detection cover 760 is compatible with existing fabrication techniques without modification.

Figure 8:
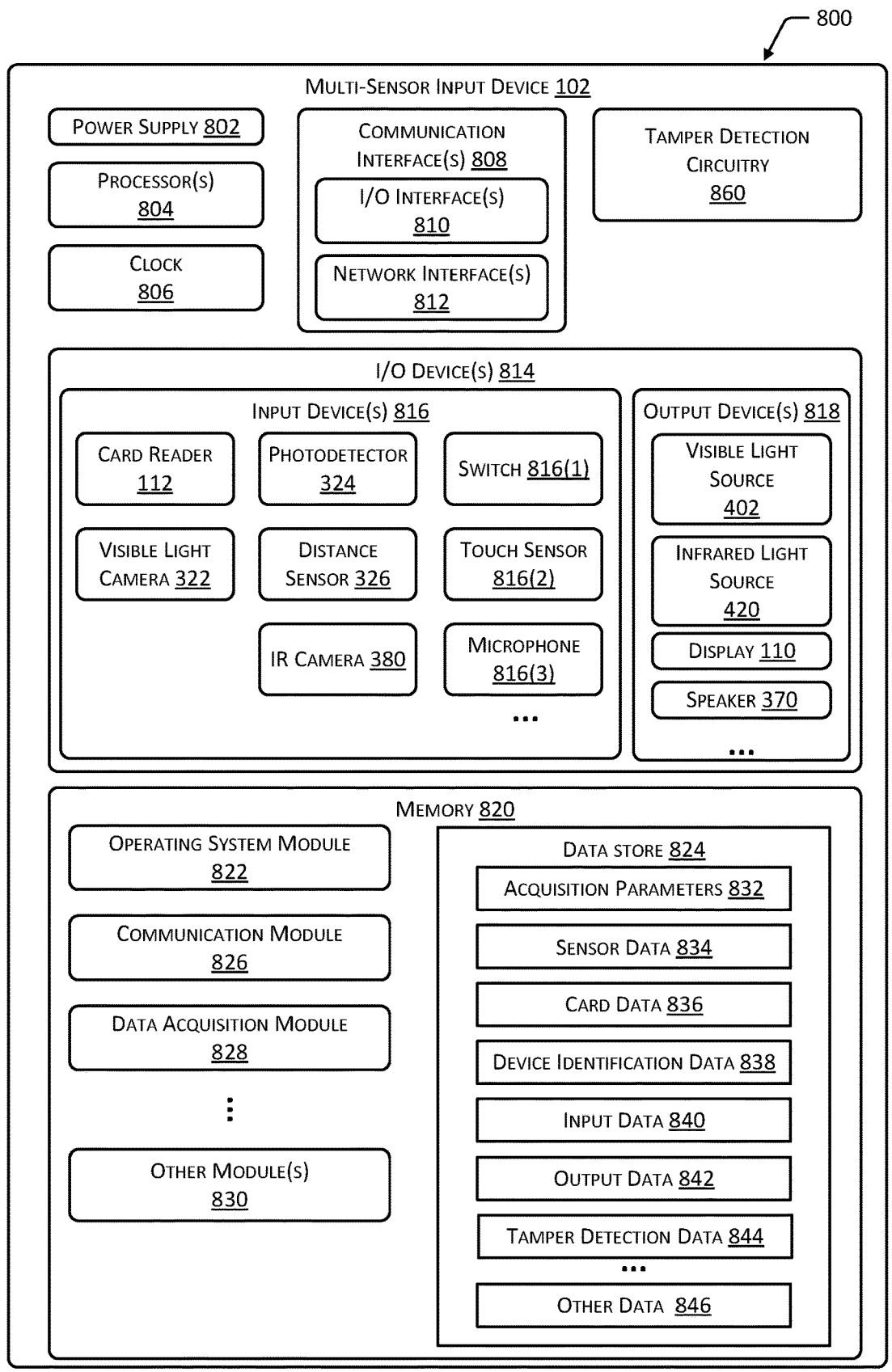
FIG. 8 is a block diagram of the device, according to some implementations.

FIG. 8 is a block diagram of the input device 102, according to some implementations.

One or more power supplies 802 are configured to provide electrical power suitable for operating the components in the input device 102. In some implementations, the power supply 802 may comprise an external power supply that is supplied by line voltage, rechargeable battery, photovoltaic cell, power conditioning circuitry, wireless power receiver, and so forth.

The input device 102 may include one or more hardware processors 804 (processors) configured to execute one or more stored instructions. The processors 804 may comprise one or more cores. One or more clocks 806 may provide information indicative of date, time, ticks, and so forth. For example, the processor 804 may use data from the clock 806 to generate a timestamp, trigger a preprogrammed action, and so forth.

The input device 102 may include one or more communication interfaces 808 such as input/output (I/O) interfaces 810, network interfaces 812, and so forth. The communication interfaces 808 enable the input device 102, or components thereof, to communicate with other devices or components. The communication interfaces 808 may include one or more I/O interfaces 810. The I/O interfaces 810 may comprise interfaces such as Bluetooth, ZigBee, Inter-Integrated Circuit (I2C), Serial Peripheral Interface bus (SPI), Universal Serial Bus (USB) as promulgated by the USB Implementers Forum, RS-232, and so forth.

The network interfaces 812 are configured to provide communications between the input device 102 and other devices, such as access points, point-of-sale devices, payment terminals, servers, and so forth. The network interfaces 812 may include devices configured to couple to wired or wireless personal area networks (PANS), local area networks (LANs), wide area networks (WANs), and so forth. For example, the network interfaces 812 may include devices compatible with Ethernet, Wi-Fi, 4G, 5G, LTE, and so forth.

The input device 102 may also include one or more buses or other internal communications hardware or software that allow for the transfer of data between the various modules and components of the input device 102. For example, the input device 102 may use one or more Universal Serial Bus interfaces.

The input device 102 may include tamper detection circuitry 860. In one implementation, the tamper detection circuitry 860 may comprise a trusted platform module (TPM). The TPM may comprise a dedicated processor that is also powered independently of the power supply 802. For example, the TPM may be powered by a battery. The tamper detection circuitry 860 may be connected to, or receive information about the status of, one or more tamper detection devices. For example, the tamper detection circuitry 860 may be connected to the tamper mesh 764, the tamper mesh 710, one or more tamper detection switches, and so forth. If the tamper detection circuitry 860 detects a tamper event, mitigating actions including, but not limited to memory erasure, self-destruction, and so forth may be performed. For example, if the tamper detection circuitry 860 detects a break in the tamper detection cover 760, the cryptographic keys stored within the memory 820 may be erased.

The tamper detection circuitry 860 may store data indicative of an order of occurrence of a plurality of tamper events. For example, a first change indicative of the tamper mesh 764 being broken at a first time may be determined. Continuing the example, a second change indicative of the tamper mesh 710 being broken at a second time after the first time may then be determined. The tamper detection circuitry 860 may store data indicative of the order of occurrence, indicating that the first change occurred before the second change. In some implementations, mitigating actions may be determined based on the order of occurrence. For example, a first order of occurrences of tamper events may result in a first action, while a second order of occurrences of tamper events may result in a second action.

The I/O interface(s) 810 may couple to one or more I/O devices 814. The I/O devices 814 may include input devices 816 and output devices 818.

The input devices 816 may include one or more of the card reader 112, the visible light camera 322, the photodetector 324, the distance sensor 326, or the infrared image sensor 388 in the infrared camera 380. Other input devices 816 may include one or more of a switch 816(1), a touch sensor 816(2), a microphone 816(3), and so forth.

Additional distance sensors 326 may be employed by the input device 102. A distance sensor 326 may be positioned on the input device 102 to detect the presence of an object outside of the FOV 108 as well. For example, a distance sensor 326 may be arranged to detect a user as they approach the input device 102. Responsive to this detection, the input device 102 may present information on the display 110, illuminate the visible light sources 402, operate the infrared image sensor 388 and infrared light sources 420, and so forth.

The switch 816(1) is configured to accept input from the user. The switch 816(1) may comprise mechanical, capacitive, optical, or other mechanisms. For example, the switch 816(1) may comprise mechanical switches configured to accept an applied force from a user's finger press to generate an input signal.

The touch sensor 816(2) may use resistive, capacitive, surface capacitance, projected capacitance, mutual capacitance, optical, Interpolating Force-Sensitive Resistance (IFSR), or other mechanisms to determine the position of a touch or near-touch of the user. For example, the IFSR may comprise a material configured to change electrical resistance responsive to an applied force. The location within the material of that change in electrical resistance may indicate the position of the touch. For example, the touch sensor 816(2) may be integrated with the display 110 to provide a touchscreen.

The microphone 816(3) may be configured to acquire information about sound present in the environment. In some implementations, a plurality of microphones 816(3) may be used to form a microphone array. The microphone array may implement beamforming techniques to provide for directionality of gain. For example, the gain may be directed towards the expected location of the user during operation of the input device 102.

Output devices 818 may include one or more of the visible light source(s) 402, the infrared light source 420, the display 110, a speaker 370, printer, haptic output device, or other devices. For example, the display 110 may be used to provide information via a graphical user interface to the user. In another example, a printer may be used to print a receipt.

In some embodiments, the I/O devices 814 may be physically incorporated with the input device 102 or may be externally placed.

The input device 102 may include one or more memories 820. The memory 820 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 820 provides storage of computer-readable instructions, data structures, program modules, and other data for the operation of the input device 102. A few example functional modules are shown stored in the memory 820, although the same functionality may alternatively be implemented in hardware, firmware, or as a system on a chip (SOC).

The memory 820 may include at least one operating system (OS) module 822. The OS module 822 is configured to manage hardware resource devices such as the I/O interfaces 810, the network interfaces 812, the I/O devices 814, and provide various services to applications or modules executing on the processors 804. The OS module 822 may implement a variant of the FreeBSD operating system as promulgated by the FreeBSD Project; other UNIX or UNIX-like operating system; a variation of the Linux operating system as promulgated by Linus Torvalds; the Windows operating system from Microsoft Corporation of Redmond, Wash., USA; the Android operating system from Google Corporation of Mountain View, Calif., USA; the iOS operating system from Apple Corporation of Cupertino, Calif., USA; or other operating systems.

A data store 824 that includes one or more of the following modules may be stored in the memory 820. These modules may be executed as foreground applications, background tasks, daemons, and so forth. The modules may include one or more of a communication module 826, data acquisition module 828, or other modules 830. The data store 824 may use a flat file, database, linked list, tree, executable code, script, or other data structure to store information. In some implementations, the data store 824 or a portion of the data store 824 may be distributed across one or more other devices.

A communication module 826 may be configured to establish communications with one or more other devices. The communications may be authenticated, encrypted, and so forth. The communication module 826 may also control the communication interfaces 808.

The data acquisition module 828 is configured to acquire data from the input devices 816. One or more acquisition parameters 832 may be stored in the memory 820. The acquisition parameters 832 may specify operation of the data acquisition module 828, such as data sample rate, sample frequency, scheduling, and so forth. The data acquisition module 828 may be configured to operate the distance sensor 326, the visible light camera 322, the photodetector 324, the visible light sources 402, the infrared image sensor 388, the infrared light sources 420, and so forth. For example, the data acquisition module 828 may acquire data from the distance sensor 326, infrared image sensor 388, or both to determine that an object is in the FOV 108. Based on this determination, the visible light sources 420 may be operated with the photodetector 324 to determine intensity data representative of the object. The intensity data may be stored as sensor data 834 in the data store 824.

Based on the intensity data determining that the object is deemed to be a person, at a first time a first set of IR light sources 420 associated with one or more portions of the IDP assembly 302 are activated to provide infrared illumination with a first polarization while the infrared image sensor 388 is used to acquire images. At a second time a second set of IR light sources 420 associated with one or more portions of the IDP assembly 302 are activated to provide infrared illumination with a second polarization while the infrared image sensor 388 is used to acquire images. Alternatively, at the second time the one or more IR light sources 420 associated with portions of the IDP assembly 302 may be activated to provide infrared illumination with the first polarization while the polarizer 386 in the optical path of the infrared image sensor 388 is set to the second polarization. The images may be stored as sensor data 834 in the data store 824.

The sensor data 834 may be sent to another device, processed by the processor 804, and so forth. For example, in one implementation the sensor data 834 may be processed to determine one or more features present in the image data acquired by the IR camera 380. Data indicative of the features may be encrypted and sent to an external device, such as a server. In the event of a tamper event detected by the tamper detection circuitry 860, the sensor data 834 may be erased.

The data acquisition module 828 may obtain data from other input devices 816. For example, card data 836 may be obtained from the card reader 112. The card data 836 may comprise encrypted data provided by a processor of the card reader 112. In the event of a tamper event detected by the tamper detection circuitry 860, the card data 836 may be erased.

Device identification data 838 may be stored in the data store 824. The device identification data 838 may provide information that is indicative of the specific input device 102. For example, the device identification data 838 may comprise a cryptographically signed digital signature. In the event of a tamper event detected by the tamper detection circuitry 860, this digital signature may be erased.

The data acquisition module 828 may store input data 840 obtained from other sensors. For example, input from a switch 816(1) or touch sensor 816(2) may be used to generate input data 840.

The other modules 830 may include a feature determination module that generates feature vectors that are representative of features present in the image data. The feature determination module may utilize one or more neural networks that accept image data as input and provide one or more feature vectors as output.

The data store 824 may store output data 842. For example, the output data 842 may comprise the feature vectors generated by processing the image data.

The other modules 830 may include a user interface module that provides a user interface using one or more of the I/O devices 814. The user interface module may be used to obtain input from the user, present information to the user, and so forth. For example, the user interface module may accept input from the user via the touch sensor 816(2) and use the visible light source(s) 402 to provide output to the user.

Other data 846 may also be stored in the data store 824.

The devices and techniques described in this disclosure may be used in a variety of settings. For example, the system may be used in conjunction with a point-of-sale (POS) device. The user may present their hand 104 to a input device 102 that is used to obtain biometric data indicative of intent and authorization to pay with an account associated with their identity. In another example, a robot may incorporate a input device 102. The robot may use the input device 102 to obtain biometric data that is then used to determine whether to deliver a parcel to the user, and based on the identification, which parcel to deliver.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A device comprising:
   an infrared image sensor that is sensitive to infrared light, wherein the infrared image sensor acquires images from within a first field of view (FOV);
   one or more visible light sources, wherein the one or more visible lights sources emit visible light with a plurality of colors during operation to illuminate at least a portion of the first FOV;
   a photodetector that is sensitive to the plurality of colors of the visible light, wherein the photodetector has a second FOV that includes at least a portion of the first FOV;
   a first polarizer with a first polarization, wherein the first polarizer is in an optical path of the infrared image sensor;
   a first polarized infrared light module to illuminate at least a portion of the first FOV, the first polarized infrared light module comprising:
   a first infrared light source, and
   a second polarizer with a second polarization; and
   a second polarized infrared light module to illuminate at least a portion of the first FOV, the second polarized infrared light module comprising:
   a second infrared light source, and
   a third polarizer with the first polarization;
   a visible light camera having a third FOV that includes at least a portion of the first FOV; and
   electronics to:
   operate the infrared image sensor to acquire first image data at a first time; and
   operate the visible light camera to acquire second image data at a second time.

2. The device of claim 1, wherein the photodetector is mounted at least one centimeter from any of the one or more visible light sources.

3. The device of claim 1, wherein the one or more visible light sources are operable to emit light in the plurality of colors; and the device further comprising the electronics to:
  operate one or more of the one or more visible light sources to illuminate the at least a portion of the first FOV with:
    a first color at a third time,
    a second color at a fourth time,
    a third color at a fifth time, and
    a fourth color at a sixth time and
  operate the photodetector to determine sensor data comprising:
    a first intensity during the third time,
    a second intensity during the fourth time,
    a third intensity during the fifth time, and
    a fourth intensity during the sixth time.

4. The device of claim 1, further comprising the electronics to:
  operate the photodetector to acquire intensity data at the first time.

5. The device of claim 1, further comprising a sensor window comprising:
  a first portion that is within the first FOV and is transmissive to infrared light and opaque to visible light; and
  a second portion that is within the second FOV and is transmissive to visible light.

6. The device of claim 1,
  wherein the visible light camera is mounted proximate to the photodetector.

7. The device of claim 1, further comprising the electronics to:
  operate one or more of the one or more visible light sources to illuminate the at least a portion of the first FOV at a third time; and
  operate one of the first polarized infrared light module or the second polarized infrared light module to illuminate the at least a portion of the first FOV at the third time.

8. The device of claim 1, further comprising:
  a first electronic component affixed to a first side of a circuit board, the circuit board comprising:
    a first contact on the first side; and
    a second contact on the first side;
  a tamper detection circuit that is connected to the first contact and the second contact; and
  a cover comprising:
    a recess;
    a third contact, proximate to the recess, on a second side of the cover;
    a fourth contact, proximate to the recess, on the second side of the cover; and
    an electrical conductor between the third contact and the fourth contact; and
  wherein the cover is affixed such that:
    the first electronic component is within the recess;
    the first contact connects to the third contact; and
    the second contact connects to the fourth contact.

9. The device of claim 1, further comprising:
  a first electrically conductive pathway;
  a second electrically conductive pathway;
  a memory, storing first computer-executable instructions; and
  a hardware processor to execute the first computer-executable instructions to:
    determine a first change in the first electrically conductive pathway at a third time;
    determine a second change in the second electrically conductive pathway at a fourth time; and
    store, in the memory, data indicative of an order of occurrence of the first change with respect to the second change.

10. A device comprising:
  an infrared image sensor that is sensitive to infrared light, wherein the infrared image sensor acquires images from within a first field of view (FOV);
  one or more visible light sources to illuminate at least a first portion of the first FOV;
  a first polarizer in an optical path of the infrared image sensor;
  a first polarized infrared light module to illuminate at least a second portion of the first FOV, the first polarized infrared light module comprising:
    a first infrared light source, and
    a second polarizer;
  a photodetector that is sensitive to a plurality of colors of visible light, wherein the photodetector has a second FOV that includes at least the first portion of the first FOV;
  a visible light camera having a third FOV that includes at least a third portion of the first FOV; and
  electronics to:
    operate the infrared image sensor to acquire first image data at a first time; and
    operate the photodetector to acquire first intensity data at a second time.

11. The device of claim 10, wherein the photodetector is mounted at least one centimeter from any of the one or more visible light sources.

12. The device of claim 10, the electronics further to:
  operate one or more of the one or more visible light sources to illuminate the at least a portion of the first FOV with:
    a first color at a third time,
    a second color at a fourth time,
    a third color at a fifth time, and
    a fourth color at a sixth time; and
  operate the photodetector to determine sensor data comprising:
    a first intensity during the third time,
    a second intensity during the fourth time,
    a third intensity during the fifth time, and
    a fourth intensity during the sixth time.

13. The device of claim 10, further comprising a sensor window comprising:
  a first portion that is within the first FOV and is transmissive to infrared light and opaque to visible light; and
  a second portion that is within the second FOV and is transmissive to visible light.

14. The device of claim 10, the electronics further to:
  operate one or more of the one or more visible light sources at the first time; and
  operate the first infrared light source at the first time.

15. The device of claim 10, further comprising:
  a first electronic component affixed to a first side of a circuit board, the circuit board comprising:
    a first contact on the first side; and
    a second contact on the first side;
  a tamper detection circuit that is connected to the first contact and the second contact; and
  a cover comprising:
    a first side of the cover;
    a recess;
    a third contact, proximate to the recess, on a second side of the cover;

a fourth contact, proximate to the recess, on the second side of the cover; and
an electrical conductor between the third contact and the fourth contact; and
wherein the cover is affixed such that:
the first electronic component is within the recess;
the first contact connects to the third contact; and
the second contact connects to the fourth contact.

16. A device comprising:
a sensor assembly comprising:
a first circuit board having: an upper side that is proximate to an inner surface of a sensor window, and a lower side;
a first plurality of visible light sources mounted on the upper side of the first circuit board;
a visible light diffuser comprising an optically transmissive material;
a visible light camera mounted on the upper side of the first circuit board, and having a first field of view extending upward through a first portion of the sensor window that is transmissive to visible light;
a photodetector mounted to the upper side of the first circuit board, wherein a second portion of the sensor window that is above the photodetector is transmissive to visible light;
a first polarized infrared light module mounted to the upper side of the first circuit board;
a second polarized infrared light module mounted to the upper side of the first circuit board; and
an infrared camera comprising:
one or more lenses,
an image sensor that is sensitive to infrared light, and
a third polarized infrared light module that is mounted between the one or more lenses and the image sensor; and
electronics to:
operate the infrared camera to acquire first image data at a first time; and
operate the photodetector to acquire first intensity data at a second time.

17. The device of claim 16, further comprising:
an upper housing having a first opening;
a lower housing; and
wherein:
the sensor window is mounted within the first opening of the upper housing;
the first plurality of visible light sources comprises:
a first light source that, when operated, emits light at a first color;
a second light source that, when operated, emits light at a second color;
a third light source that, when operated, emits light at a third color; and
a fourth light source that, when operated, emits light at a fourth color;
a first portion of the visible light diffuser is proximate to the first plurality of visible light sources and a second portion of the visible light diffuser is within the first opening of the upper housing;
the first polarized infrared light module comprises:
a first infrared light source, and
a first polarizer, with a first polarization, that is mounted above the first infrared light source; and
the second polarized infrared light module comprises:
a second infrared light source, and
a second polarizer, with a second polarization, that is mounted above the second infrared light source.

18. The device of claim 17,
wherein the electronics, enclosed by the upper housing and the lower housing, comprising:
a memory, storing first computer-executable instructions; and
a hardware processor to execute the first computer-executable instructions to:
operate one or more of the first plurality of visible light sources;
operate the photodetector;
operate the first infrared light source;
operate the second infrared light source; and
operate the image sensor.

19. The device of claim 16, further comprising:
a first electronic component affixed to a first side of a circuit board, the circuit board comprising:
a first contact on the first side; and
a second contact on the first side;
a tamper detection circuit that is connected to the first contact and the second contact; and
a cover comprising:
a first side of the cover;
a recess;
a third contact, proximate to the recess, on a second side of the cover;
a fourth contact, proximate to the recess, on the second side of the cover; and
an electrical conductor between the third contact and the fourth contact; and
wherein the cover is affixed such that:
the first electronic component is within the recess;
the first contact connects to the third contact; and
the second contact connects to the fourth contact.

20. A device comprising:
one or more visible light sources, wherein the one or more visible light sources emit visible light with a plurality of colors during operation to illuminate at least a portion of a first field of view (FOV);
a photodetector that is sensitive to the plurality of colors of the visible light, wherein the photodetector has a second FOV that includes at least a portion of the first FOV; and
electronics to:
operate one or more of the one or more visible light sources to illuminate the at least a portion of the first FOV with:
a first color at a first time,
a second color at a second time,
a third color at a third time, and
a fourth color at a fourth time; and
operate the photodetector to determine sensor data comprising:
a first intensity during the first time,
a second intensity during the second time,
a third intensity during the third time, and
a fourth intensity during the fourth time.

21. A device comprising:
a sensor assembly comprising:
a first circuit board having: an upper side that is proximate to an inner surface of a sensor window, and a lower side;
a first plurality of visible light sources mounted on the upper side of the first circuit board;
a visible light diffuser comprising an optically transmissive material;
a visible light camera mounted on the upper side of the first circuit board, and having a first field of view extending upward through a first portion of the sensor window that is transmissive to visible light;
a photodetector mounted to the upper side of the first circuit board, wherein a second portion the sensor window that is above the photodetector is transmissive to visible light;
a first polarized infrared light module mounted to the upper side of the first circuit board; and
a second polarized infrared light module mounted to the upper side of the first circuit board.

* * * * *

UNITED STATES PATENT AND TRADEMARK OFFICE
CERTIFICATE OF CORRECTION

| | | |
|---|---|---|
| PATENT NO. | : 12,051,277 B1 | Page 1 of 1 |
| APPLICATION NO. | : 17/303626 | |
| DATED | : July 30, 2024 | |
| INVENTOR(S) | : Amit Sharad Kulkarni et al. | |

It is certified that error appears in the above-identified patent and that said Letters Patent is hereby corrected as shown below:

In the Claims

Column 24, Claim 12, Line 34:
Currently reads "sources to illuminate the at least a portion of the first FOV"
Where it should read --sources to illuminate the at least a first portion of the first FOV--

Signed and Sealed this
Tenth Day of September, 2024

Katherine Kelly Vidal
*Director of the United States Patent and Trademark Office*